Nov. 1, 1955  B. D. STUVEL  2,722,238

INTERNAL PIPE LOCATING FITTING

Filed Oct. 24, 1952

INVENTOR,
BERNARD D. STUVEL,
BY Herbert G. Minturn,
ATTORNEY.

United States Patent Office 2,722,238
Patented Nov. 1, 1955

2,722,238

INTERNAL PIPE LOCATING FITTING

Bernard D. Stuvel, Indianapolis, Ind.

Application October 24, 1952, Serial No. 316,581

1 Claim. (Cl. 138—89)

This invention relates to a pipe fitting externally threaded and having an internal bore closed at one end and open at the other end, this bore being threaded, for the purpose of locating and centrally supporting a pipe in spaced relation within a telescoping pipe.

The invention greatly simplifies the problem of supporting two telescoping pipes in spaced relation where those pipes are to terminate in "dead" ends. The advantages of the invention will be readily appreciated by those versed in the art in the one particular form of the invention as illustrated in the accompanying drawing, in which Fig. 1 is a view in side elevation of the fitting embodying the invention;

Figure 1:
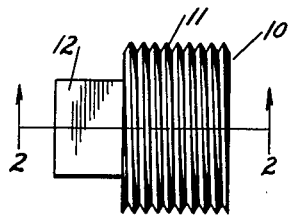
Figure 2:
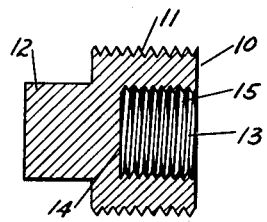
Fig. 2 is a central longitudinal section through the fitting.

The fitting generally designated by the numeral 10 consists essentially of a cylindrical body which is provided with the external threads 11, and a head 12 extending from the body as a means of revolving the fitting when it is to be installed.

The fitting 10 is provided with an internal bore 13 terminating by a closed end 14 and provided with the internal threads 15, the bore 13 opening from the end opposite to the head 12. Obviously the fitting may be made in any desired size and relationship of diameters of the external and internal threads 11 and 15 respectively to meet the requirements.

Figure 3:
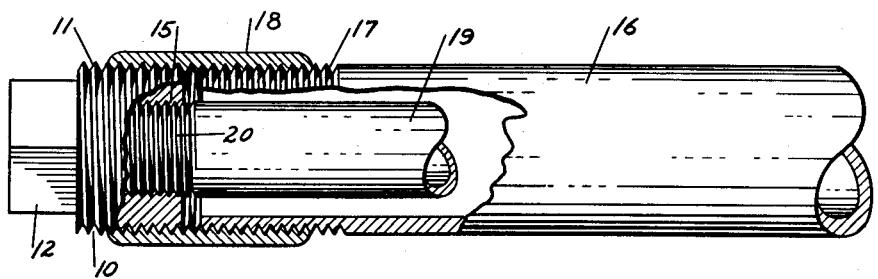
Fig. 3 is a view in side elevation and partial section of the fitting as applied to telescoping pipes.

As illustrated in Fig. 3, an external pipe 16 is normally screw threaded by the threads 17 at one end thereof. The threads 17 receive the usual coupling or collar 18 screw threadedly thereon. The pipe 16 is to have an internal pipe 19 carried axially thereof and in spaced relation from the inside wall of the pipe 16.

The fitting 10 is entered over the screw-threaded end 20 of the pipe 19 by the internal threads 15, and then the assembly is entered through the coupling 18 to have the pipe 19 extend within the pipe 16, and the fitting external threads 11 engage the internal threads of the collar 18 until a tight fitting is secured therebetween by rotating the fitting 10. The rotation is effected by gripping the head 12.

While I have herein shown and described my invention in the one particular form and application, structural variations may be employed without departing from the spirit of the invention, and I therefore do not desire to be limited to that precise form beyond the limitations which may be imposed by the following claim.

I claim:

The combination with an external pipe and an internal pipe telescoping within the external pipe, each of said pipes having externally screw-threaded ends; a coupling screw-threadedly engaging by a portion of its length over the threads of said external pipe; and a fitting screw-threadedly engaging within the remaining portion of said coupling, said fitting having a bore entering therein and screw-threadedly engaging over said internal pipe end; said fitting bore being closed off by an end wall at the end of said internal pipe extending therein.

References Cited in the file of this patent

UNITED STATES PATENTS

| | | |
|---|---|---|
| 640,860 | Baum | Jan. 9, 1900 |
| 1,144,868 | Roy | June 29, 1915 |
| 2,310,351 | Bowan | Feb. 9, 1943 |